United States Patent
Comunale et al.

(10) Patent No.: US 10,792,756 B2
(45) Date of Patent: Oct. 6, 2020

(54) ADDITIVE METAL MANUFACTURING SYSTEM FOR IN-SITU METROLOGY AND PROCESS CONTROL

(71) Applicants: Richard A Comunale, Ipswich, MA (US); John E Ivory, New Hartford, NY (US); Brian Bassett, South Hampton, NH (US)

(72) Inventors: Richard A Comunale, Ipswich, MA (US); John E Ivory, New Hartford, NY (US); Brian Bassett, South Hampton, NH (US)

( * ) Notice: Subject to any disclaimer, the term of this patent is extended or adjusted under 35 U.S.C. 154(b) by 0 days.

(21) Appl. No.: 15/675,767

(22) Filed: Aug. 13, 2017

(65) Prior Publication Data
US 2019/0047077 A1    Feb. 14, 2019

(51) Int. Cl.
*B23K 15/00* (2006.01)
*B33Y 10/00* (2015.01)
*B33Y 30/00* (2015.01)
*B33Y 50/02* (2015.01)
*B23K 15/02* (2006.01)
*B23K 31/12* (2006.01)

(52) U.S. Cl.
CPC ........ *B23K 15/0086* (2013.01); *B23K 15/004* (2013.01); *B23K 15/0013* (2013.01); *B23K 15/0026* (2013.01); *B23K 15/02* (2013.01); *B23K 31/125* (2013.01); *B33Y 10/00* (2014.12); *B33Y 30/00* (2014.12); *B33Y 50/02* (2014.12)

(58) Field of Classification Search
CPC ............ B23K 15/0086; B23K 15/0013; B23K 15/0026; B23K 15/004; B23K 15/02; B23K 31/125; B33Y 10/00; B33Y 30/00; B33Y 50/02
USPC ............................ 250/306, 307, 396 R, 397
See application file for complete search history.

(56) References Cited

U.S. PATENT DOCUMENTS

| | | | |
|---|---|---|---|
| 2003/0127604 A1* | 7/2003 | Todokoro | H01J 37/244 250/436 |
| 2011/0061591 A1* | 3/2011 | Stecker | B22F 3/1055 118/663 |
| 2015/0258626 A1* | 9/2015 | Seufzer | B23K 15/0086 219/121.15 |

* cited by examiner

*Primary Examiner* — Nicole M Ippolito (57) ABSTRACT

This disclosure provides systems, methods and apparatus systems and methods described herein provide, among other things, a system for additive manufacturing of metal objects. The system includes two electron beams. In one optional implementation, one beam is high powered and acts as a deposition beam that melts a metal feed stock material which is delivered to a deposition zone and onto a work surface and the second electron beam is a low power electron source. The second electron beam acts as an interrogating source that generates an electron beam which interacts with the deposited material. The second electron beam may be active after material is deposited and provides post-deposition in-situ metrology. Various signals generated by this second beam/material interaction are collected and used to provide information about the melted and deposited material.

20 Claims, 7 Drawing Sheets

Figure 1

(prior art)

Figure 2-Deposition Mode

Figure 3-Interrogation mode

ADDITIVE METAL MANUFACTURING SYSTEM FOR IN-SITU METROLOGY AND PROCESS CONTROL

CROSS-REFERENCE TO RELATED APPLICATIONS

This Patent Application claims priority to U.S. Provisional Patent Application No. 62/374,099 filed Aug. 12, 2016 entitled "Additive Metal Manufacturing System for In-Situ Metrology and Process Control Title" and assigned to the assignee hereof. The disclosure of the prior Application is considered part of and is incorporated by reference in this Patent Application.

TECHNICAL FIELD

The systems and methods described herein relate to manufacturing objects using additive manufacturing techniques, and more particularly to additive manufacturing processes that manufacture metal parts.

DESCRIPTION OF THE RELATED TECHNOLOGY

Additive manufacturing requires the addition of material, such as plastic or metal, onto an earlier layer of material. One technique for manufacturing metal parts is a laser or electron beam wire deposition process (Laser/EB wire additive manufacturing). In Laser/EB wire additive manufacturing, a wire feed of stock material, such as aluminum wire, is fed in front of a laser or electron beam. The energy from the beam melts the wire and the deposit of wire is formed on a workpiece. Laser/EB wire additive manufacturing are generally recognized as providing high rates of deposition using a low cost feedstock. One generic wire feed system is described in William E. Frazier, Metal Additive Manufacturing: A Review, Journal of Materials Engineering and Performance 23:1917-1923 (2014). Frazier discloses a process where a wire feed is brought into the line of an EB gun and the electron beam heats the wire. The heated wire is placed over the substrate and layers are deposited incrementally to build the part.

Laser/EB wire feed devices, as well as other additive manufacturing devices can work well but tend to have low tolerances and develop features that have low precision, and therefore being less precisely made than the required specifications for the object. This requires subsequent machining of the manufactured item to allow the features of the item to meet any required geometry and tolerances.

Figure 1:
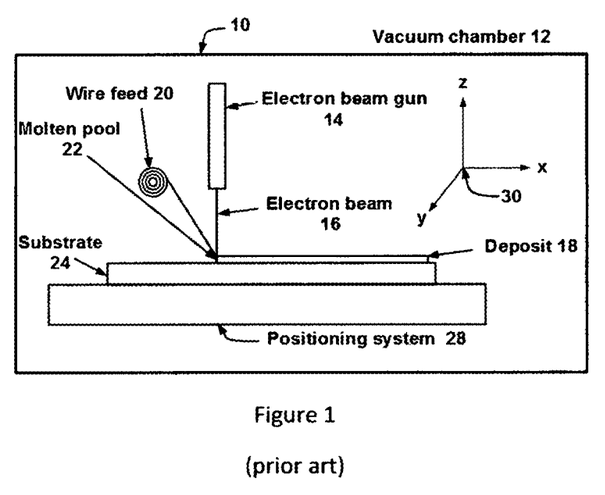
FIG. 1 is an electron beam wire feed additive manufacturing system of the prior art.

To improve accuracy of the building process, conventional feed forward and feedback control techniques have been considered. One challenge to building feedback control into these system is the brutality of the environment produced during the deposition process. See Seufzer et al., Control Methods for the Electron Beam Free Form Fabrication Process, White Paper NASA Langley Research Center (undated). FIG. 1 reproduces an image from Suefzer and shows the basic technical components of an EB wire feed deposition system. The wire feedstock is melted to create a molten pool and the beam sustains that molten pool. To prevent contamination of the pool, the work is done in a vacuum or with shield gasses. As shield gasses are consumable and add to cost and complexity, a vacuum is often preferred. However, the vacuum around the molten pool creates a difficult environment for optical and thermal sensors. These sensors are required to take measurements needed for controlling the deposition and manufacturing process using either a feedforward or feedback control system. Optical and thermal imaging systems have been developed, such as the systems described in U.S. Pat. No. 6,459,951, but these systems do poorly in the metal-vapor environment surrounding the work piece. As alternatives, electron detectors that detect heat and other conditions have been used with EB wire feed depositions systems and such systems are shown for example in U.S. Pat. No. 8,809,780 to Wollenhaupt et. al. In Wollenhaupt et. al., the detectors monitor conditions of the molten pool. For example, electron detectors were used to monitor the oscillation frequency of a molten pool deposit, and correlate that measure with the depth of a deposition pool, which can indicate how deeply the layer is binding to the work piece. However, such characteristics lack the ability to measure features sizes and geometry during deposition, which are needed to control the formation of the features and the shape of the device being manufactured.

In U.S. Pat. No. 8,344,281 to Taminger et. al. disclose a control method and process for wire feed deposition of metals. The disclosed system uses beam deflection to control an electron beam wire deposition process. The system has a self-corrective method for control over the location, power, and dwell time of the electron beam, and uses this control to generate a complex raster pattern that controls the thermal input delivered to the wire. In this way, the raster pattern focuses the beam on to the outside of the wire, using this controlled energy delivery to redirect and position the wire. The method is "self-correcting" in that it maintains the wire in the pool without requiring sensing or external changes to the raster pattern or wire orientation. The disclosed system may also use a raster pattern that sets a periodic pattern during which a period of the raster is used to observe the electron beam by detecting diffracted or secondary electrons using an electron beam detector, such as those used on scanning electron microscopes.

Although, the above additive systems can work well, they lack the ability to create accurate real-time metrology of the item being manufactured. Accordingly, there is a need in the art for improved systems for measuring and controlling deposition of material during additive manufacturing.

SUMMARY

The systems, methods and devices of this disclosure each have several innovative aspects, no single one of which is solely responsible for the desirable attributes disclosed herein.

One innovative aspect of the subject matter described in this disclosure can be implemented in systems and methods described herein provide, among other things, a system for additive manufacturing of metal objects. The system includes two electron beams. In one optional implementation, one beam is high powered and acts as a deposition beam that melts a metal feed stock material which is delivered to a deposition zone and onto a work surface and the second electron beam is a low power electron source. The second electron beam acts as an interrogating source that generates an electron beam which interacts with the deposited material. The second electron beam may be active after material is deposited and provides post-deposition in-situ metrology. Various signals generated by this second beam/material interaction are collected and used to provide information about the melted and deposited material.

In one embodiment, the second electron source may be similar to a Scanning Electron Microscope (SEM) that is capable of collecting electrons to generate images. An SEM is an electron microscope that produces images of a sample by scanning the sample with a focused beam of electrons. The electrons interact with atoms in the sample, producing various signals that contain information about the sample's surface topography and composition. The electron beam is generally scanned in a raster scan pattern, and the beam's position is combined with the detected signal to produce an image. SEM can achieve resolution better than one (1) nanometer. SEMs may detect back scattered electrons of secondary electrons. In such an embodiment, electrons are collected with an electron detector that includes a conductive plate. It is understood that vapor and debris from a molten pool on the work surface can settle on and join to the conductive plate. As the debris and vapor are conductive, or become conductive when deposited on the conductor, electrons landing on the collector travel past the debris and are measured by the collector. This allows the electron detector to be in situ and to detect electrons contacting the work surface. The detected electrons can be used to generated data information that can then be used for process characterization and/or process control.

In an alternative embodiment, the second beam is an interrogating beam and has a higher energy than the deposition beam. The system has an electron detector with an energy filter that filters signal electrons based on their energy. This allows the detector to collect signal electrons associated with the interrogation beam separate from other electrons moving through the area.

By filtering the electrons that are sent to the electron detector, the interrogating beam and the deposition beam may be operated simultaneously and deposition and metrology can take place simultaneously, making any collected information available as a feedback input for process control. In other embodiments, optical detectors are provided, typically spaced from the work space a sufficient distance to reduce the likelihood that material from the molten pool will collect on the optical detector. The optical detectors may, alone or in combination with the interrogating beam be used to determine a measurement in the z-direction for the material being deposited.

Another innovative aspect of the subject matter described in this disclosure can be implemented in a system for manufacturing an object, comprising a work surface being exposed to the ambient environment and for supporting the object, a deposition source for generating a deposition beam of electrons at a power sufficient to melt a metal wire to thereby deposit metal on the object, a wire feed unit for feeding metal wire to the deposition beam, an interrogation source for generating an imaging beam of electrons having a current set for creating reflected electrons off the object, and an electron detector including a metal plate with an aperture therein and being located to align the aperture to the path of the deposition beam and for detecting the reflected electrons, and being electrically isolated from the work surface and the deposition source and the interrogation source and being electrically coupled to a remote ground through an amplifier capable of amplifying a current passing through the metal plate and toward the remote ground.

In another embodiment, the system has a metal plate that includes a first conductive plate and a second conductive plate, each being electrically isolated from each other and each connected to a remote ground through an amplifier. Alternatively, the metal plate includes four plates, each being electrically isolated from each other and each being connected to a remote ground through an amplifier. Further, alternatively, the metal plate includes a second aperture for allowing the interrogation beam to pass through the detector and toward the work surface. Optionally and alternatively, the system further comprises an energy filter disposed in a path between the work surface and the electron detector and generating an electric field of a set strength selected to prevent electrons below a set energy characteristic from reaching the electron detector.

In another embodiment, the deposition beam is at a first current and the interrogation beam is at a second higher current. The system may further comprise a data processor coupled to the amplifier and capable of measuring the amplitude of the current passing through the amplifier. Optionally, a scan controller may be used for measuring a location of the impingement of the interrogation beam. Further optionally, an image processor for creating an image of the object as a function of the measured current and the location of the impingement of the interrogation beam. The system may also have an object height measurement system for focusing an image of the object to measure the height of the object along an axis extending normal from the work surface.

In another aspect, the systems and methods described herein include a method for manufacturing an object, comprising supporting an object on a work surface being exposed to the ambient environment, generating a deposition beam of electrons at a power sufficient to melt a metal wire to thereby deposit metal on the object, feeding metal wire to the deposition beam, generating an imaging beam of electrons having a current set for creating reflected electrons off the object, and detecting reflected electrons impinging on a metal plate having an aperture therein and being located to align the aperture to the path of the deposition beam, and being electrically isolated from the work surface and the deposition source and the interrogation source and being electrically coupled to a remote ground through an amplifier capable of amplifying a current passing through the metal plate and toward the remote ground.

In certain embodiments, the method further comprises providing the metal plate with a first conductive plate and a second conductive plate, each being electrically isolated from each other and each connected to a remote ground through an amplifier. Alternatively, the method comprises providing the metal plate with four plates, each being electrically isolated from each other and each being connected to a remote ground through an amplifier, or providing the metal plate with a second aperture for allowing the interrogation beam to pass through the detector and toward the work surface.

Optionally, the method further comprises locating an energy filter in a path between the work surface and the electron detector and generating an electric field of a set strength selected to prevent electrons below a set energy characteristic from reaching the electron detector.

In some embodiments, the deposition beam is at a first current and the interrogation beam is at a second higher current.

In some embodiments, the method provides a data processor coupled to the amplifier and capable of measuring the amplitude of the current passing through the amplifier. There may also be a scan controller for measuring a location of the impingement of the interrogation beam. Further, an image processor may create an image of the object as a function of the measured current and the location of the impingement of the interrogation beam. The methods may measure an object height by focusing an image of the object to measure the height of the object along an axis extending normal from the work surface.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

The foregoing and other objects and advantages of the invention will be appreciated more fully from the following further description thereof, with reference to the accompanying drawings wherein.

Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways.

FIG. 1 depicts a prior art electron beam wire feed deposition 10 system that is depositing layers of material on a substrate. The device is in a vacuum chamber 12 and includes an electron beam gun 14 that directs and electron beam 16 at a wire feed 20. The vacuum chamber 12 will attach to a suitable vacuum pump system (not shown) so that the pressure within the vacuum chamber stays between levels suitable for the deposition applications. The electron beam gun 14 will typically include a cathode assembly, an anode assembly, focusing and deflection optics. The vacuum pump system, such as a turbomolecular pump, reduces and maintains the pressure within the vacuum chamber 12 as needed. The wire feed 20 is a source of deposition material and the wire feed 20 is placed over the substrate 24. The electron beam 16 strikes the wire feed 20 and deposits material on the substrate 24. The substrate 24 is carried on a positioning system 28 that moves the substrate 24 in a plane and under the wire feed 20 and the electron beam 16. The electron beam 16 strikes the wire feed 20 and creates a molten pool of material that can adhere to the substrate 24. As the positioning system 28 moves, the molten pool can contact different areas of the substrate 24 to deposit material on those areas. In one example, the wire feed 20 is a wire of an aluminum based composition, such as a wire of 97% Al, and 0.5% of Si, Mg, Cr and Cu each. When melted, the wire forms a slurry that can vaporize in part and adhere to components of the system 10 that are proximate the molten pool. Thus; vapor typical ends up obscuring optical detectors (not shown) placed proximate the molten pool. Additionally, the brightness of the molten pool tends to make it difficult to view, by way of optical detectors or sensors, the features being formed at the point of that pool.

Figure 2:
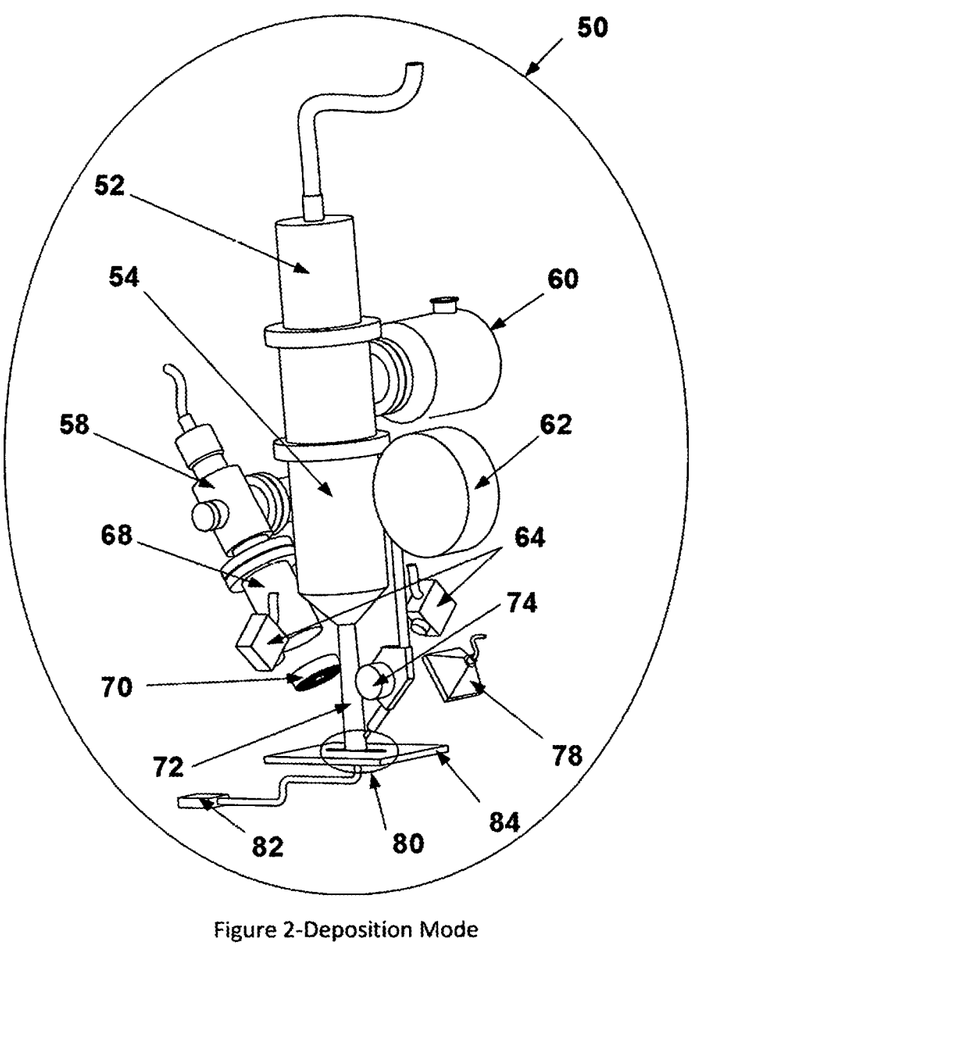
FIG. 2 is one embodiment of a system according to the invention operating in deposit mode.
Figure 3:
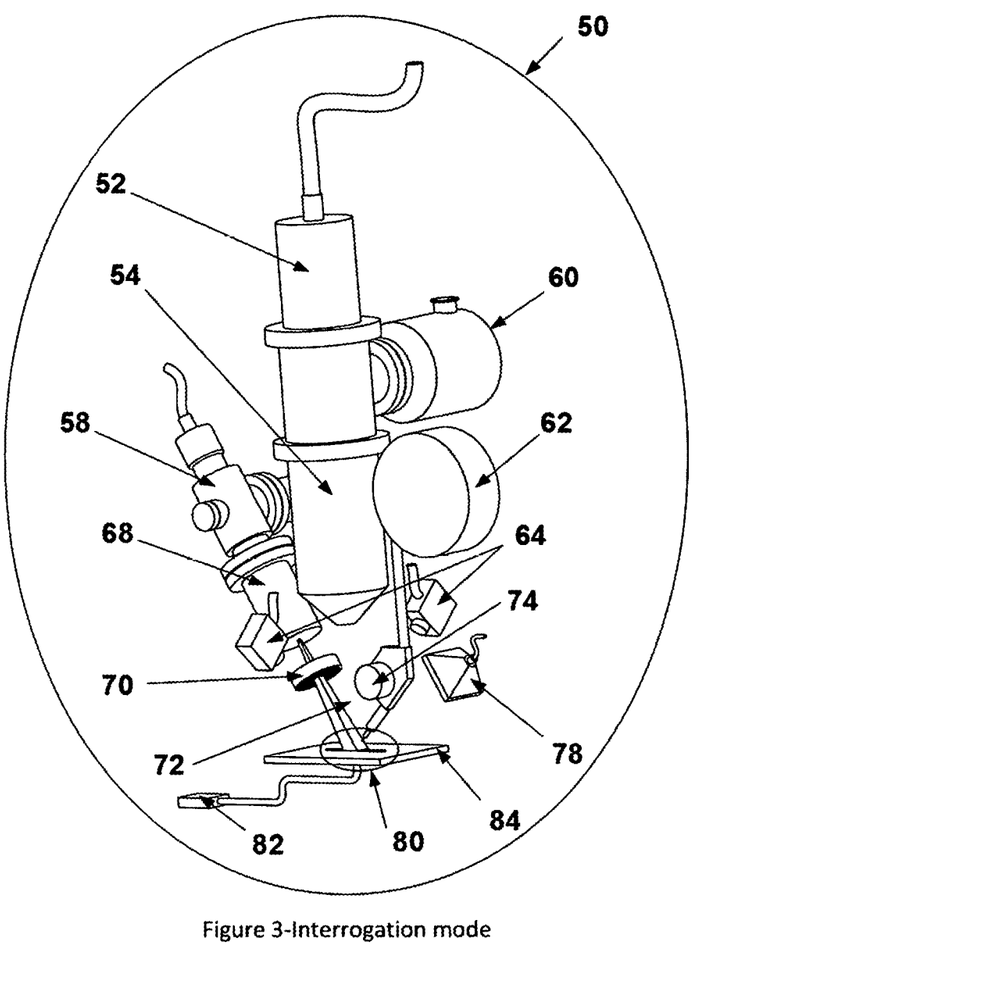
FIG. 3 is the system of FIG. 2 operating in interrogation mode.

FIGS. 2 and 3 illustrate one example of a system 50 according to the invention that includes two electron beams; one beam for depositing material and one beam for interrogating the substrate to collect metrology data. Both Figures illustrate that the system 50 includes a deposition source 52 with deposition scan and focus optics 54. FIG. 2 illustrates the system 50 in deposition mode, with the deposition beam active and projected toward the work surface. FIG. 3 depicts the same system 50, but operating in interrogation mode and having an interrogation beam directed toward the work surface. For the purpose of clarity, the similar elements of FIGS. 2 and 3 will be described with reference to FIG. 2. Turning back to FIG. 2, a deposition source pump 60 creates a vacuum for the deposition source 52. The deposition source 52 may be any suitable deposition source including a commercially of the shelf electron beam source capable of acting like an e-beam welder. In one example, the deposition source 52 generates a beam having a current of about 50 milliamps, and in other embodiments the deposition current may range from 1 milliamp to 200 milliamps, or any suitable current that is sufficient for the operation of melting wire feed to deposit metal onto an object being manufactured, or into the molten pool, or to form a molten pool.

The deposition source 52 is directed to a deposition zone 80 on a moveable platform 84. Also above the deposition zone 80 on the movable platform 84 is a wire feed mechanism 74 that feeds wire to into the electron beam 72 generated by the deposition source 52. A wire reel 62 provides the wire feed mechanism 74 with a source of wire material. The wire on the reel may be any metal material capable of forming a weld. Typically, the wire will include Aluminum, Steel, Alloy Steels, Cobalt Steels and Stainless Steel, Titanium and Titanium Alloys, Tantalum, Tungsten, Niobium, Molybdenum, Inconel, Nickel and Copper Nickel Alloys, Zircalloy or any of the commonly used welding wires, such as those commercially available through the Grainger Catalog. Additionally, the systems and methods described herein may be used with specialty alloys. Further, the wire feed system may, in some applications, be replaced with a powder-fed systems, that will deliver powder through a nozzle, which is melted by an electron beam. In one particular example, the wire feed 20 is a wire of an aluminum based composition, such as a wire of 97% Al, and 0.5% of Si, Mg, Cr and Cu each. The wire stock may be any suitable thickness, and may for example range from one ten-thousandths of an inch to one tenth of an inch in diameter. When melted, the wire forms a slurry that can vaporize in part and adhere to components of the system 10 that are proximate the molten pool on the deposition zone 80.

Additionally, the system 50 includes an interrogation source 58 that is disposed above interrogation scan and focus optics 68. In this embodiment, the interrogation source 58 is a high energy source that delivers a beam of high energy electrons to the deposition zone 80. A high energy filtered electron detector 70 is placed above the deposition zone 80 and disposed to allow electrons back scattered from the deposition zone 80 to contact the high energy filter electron detector 70. A low energy electron detector 78 is also placed above the deposition zone 80 and oriented to collect electrons emitted from the deposition zone 80. The interrogation source 58 may be any suitable e-beam source including a commercially off the shelf electron beam source such as those manufactured by Kimball Physics of Wilton N.H. In one example, the interrogation source 58 is a 30 KV source. In other embodiments the interrogation source ranges from 10 KV to 100 KV, and in any case the energy of the beam source 58 is selected for the application being addressed and can be determined by the skilled person. The beam current for the interrogation source 58 may also be selected by the skilled person based on the parameters of the application, such as the type of metal being deposited and the type, location and number of detectors 70 being used to detect backscattered and secondary electrons coming from the work surface 84 or deposition zone 80. In one example, the interrogation source 58 may produce a beam having a current in the microamp range and may also produce a current in the milliamp range. For example, the beam current of interrogation source 58 may vary from 100 microamps to 2 milliamps. FIG. 3 shows the system 50 operating in interrogation mode and having an electron beam delivered from the interrogation source toward the work surface 84.

Further additionally and optionally, the system 50 includes optical sensors 64. In the embodiment pictured, there are two optical sensors 64 disposed at different locations and directed toward the deposition zone 80. The optical detectors 64 can collect optical signals to create images of the object being manufactured.

Further, a component current detector 82 is electrically coupled to the deposition zone 80 to detect when an electron beam is incident on the deposition zone 80. The component current detector 82 can detect stage current which is the current passing through the conductive movable platform 84. The stage current is cause by the electrons of the electron beam, whether the deposition beam or the interrogation beam, contacting the object and the movable platform 84. The system 50 may include an ammeter to measure the stage current (in amperes, typically microamps). The measured stage current may be used to determine the amount of the incident electron beam that reflected off the object. To this end, the system 50 may determine the difference between the current of the incident electron beam and the stage current. The calculated difference represents the reflected current.

In this example, the deposition beam 72 from the deposition source 52 is high powered and acts as a deposition beam 72 that melts the metal feed stock material, which is delivered to the deposition zone 80, onto a work surface. The interrogation source 58 is a second source that may be a low power electron source. The interrogation source 58 is used to generate an electron beam which interacts with the deposited material. Various signals generated by this beam/material interaction are collected and used to provide information about the melted and deposited material. This information can then be used for process characterization and/or process control.

In this example, an alternative is to have the second beam be an interrogating beam with a higher energy than the deposition beam. For example, the interrogation beam may be a 30 kV beam. The electron detector 70 has the energy filter to filter signal electrons based on their energy.

By filtering the electrons that are reflected and/or back scattered to the electron detector 70, the interrogating beam and the deposition beam 72 may be operated simultaneously and deposition and metrology can take place simultaneously, making any collected information available as a feedback input for process control. The detection of reflected electrons, including backscattered and secondary electrons is described in more detail with reference to FIG. 7 which shows one embodiment of the electron detector positioned around the work space 84 and arranged to detect electrons impinging on the surface of the detector.

Alternatively, in one embodiment, the deposition source 52 is a high power source with optics that are optimized for deposition of a metal. The interrogation source 58 is an interrogating electron beam that can be generated by a low power source with optics that focus the beam to collect data about the deposited material. To that end, a signal collector can be the low energy electron detector that is placed adjacent the interrogating beam source 58 to collect electrons for post-deposition in-situ metrology. Essentially, this system adds an SEM (scanning electron microscope) into an additive manufacturing tool and uses the measurement and analytical capabilities of the SEM on completed parts.

In operation, the system 50 may use the deposition beam and interrogating beam essentially simultaneously to allow deposition and interrogating during the same time period. This is significant in that the information collected by the interrogating beam can be used for active (closed-loop) control of the deposition beam. Closed-loop control, whether feed forward or feedback can be used to control the deposition process as it occurs.

To achieve this essential simultaneity, in one example, the system 50 can include a timing control unit (not shown) that synchronizes alternately exposing and blanking the deposition and interrogation beams, allowing the interrogating signal to be collected during the "quiet" periods of the deposition beam. A timing control unit can be a computer processor that controls the operational duty cycles of the deposition source 52 and the interrogation source 58. Each source 52 and 58 can have a period of operation during which a beam is emitted from the respective source and a period of inactivity during which a beam is not emitted from that respective source. The period of inactivity may be a blanking period and the relative time of the blanking period as compared to the period of emission is the duty cycle. The duty cycle of each beam, and the required blanking frequencies, are determined by the parameters of the process being carried out, including but not limited to, the thermal time constants of the deposition process, and the critical control input frequency of the deposition beam control system.

In an alternative example, by using an interrogating beam source 58 of higher energy than the deposition beam source 52, and using an energy filtering detector, such as the depicted high energy filtered detector 70, to collect signal electrons (back scattered and/or secondary) that are at energies greater than that of the deposition beam, the interrogating beam and the deposition beam may be operated simultaneously. For example, if the deposition beam is limited to about 40 kV, the deposition beam cannot generate back-scattered signal electrons of greater than about 40 kV. By operating the interrogating beam at some higher energy, about 50 kV for example, and arranging the signal electron detector 70 to filter out all signal electrons of 40 kV or less in potential, the only signal electrons captured will be those generated by the interrogating beam.

Figure 4:
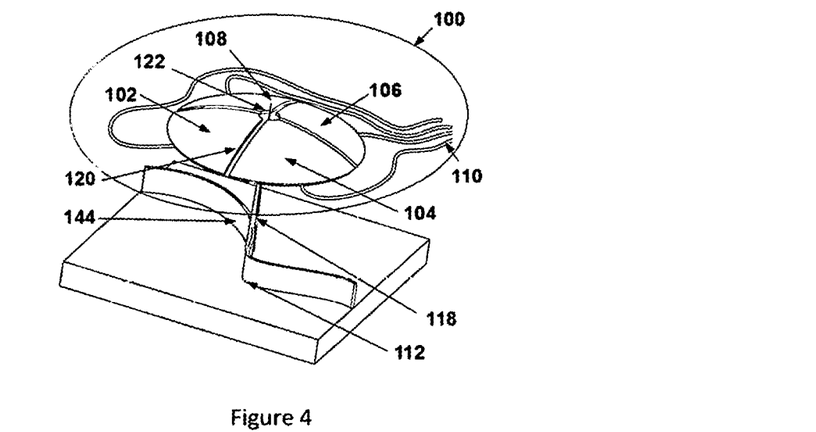
FIGS. 4-6 are pictures of conductive plate sensors for detecting electrons.
Figure 5:
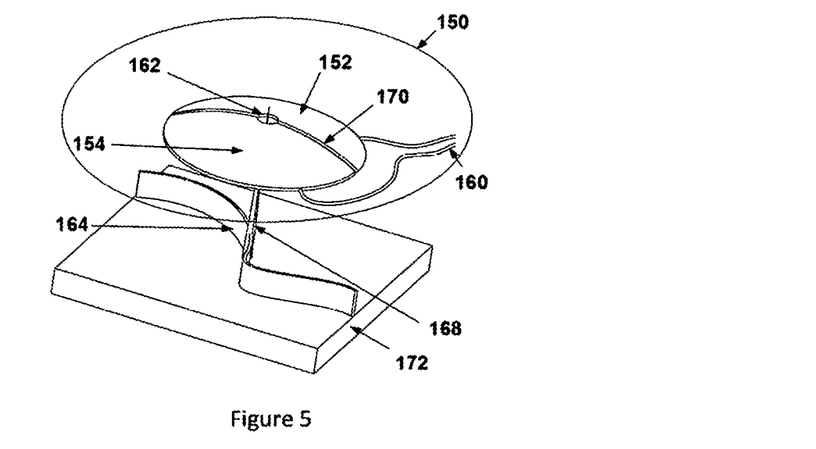
Figure 6:
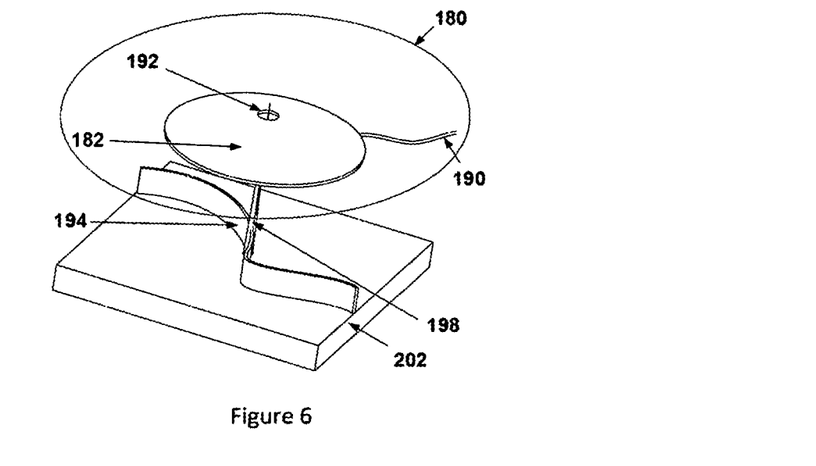

FIGS. 4-6 depict different examples of conductive plates that may be used for the electron detectors. Each electron detector in each FIG. 4-6 has a metal plate with an aperture. The aperture is located relative to the deposition (and/or interrogation source) to align with the path of the deposition beam. This positions the detector to detect reflected electrons. Each detector may also be electrically isolated from the work surface and the deposition source and the interrogation source and electrically couple to a remote ground through an amplifier capable of amplifying a current passing through the metal plate and toward the remote ground. FIG.

Figure 7:
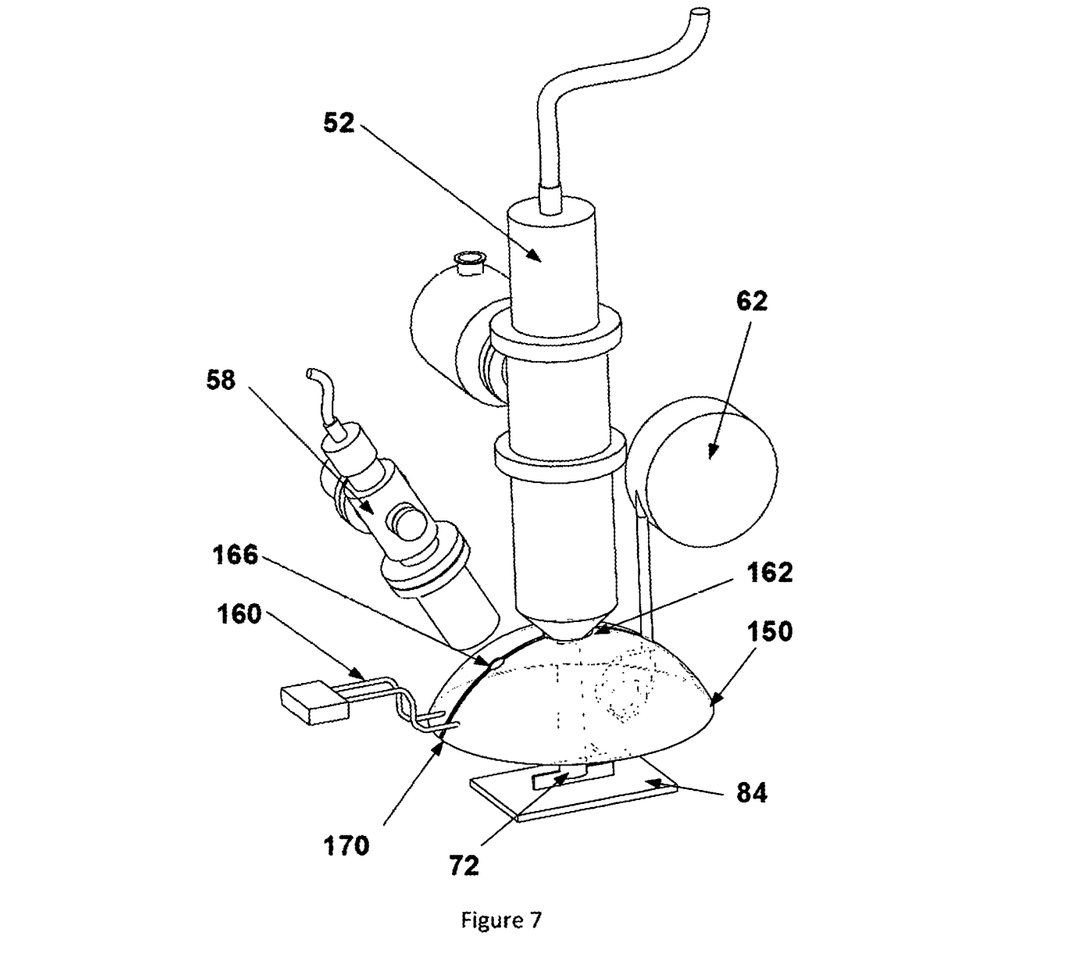
FIG. 7 shows the conductive plate with the source disposed above that plate.
Figure 8:
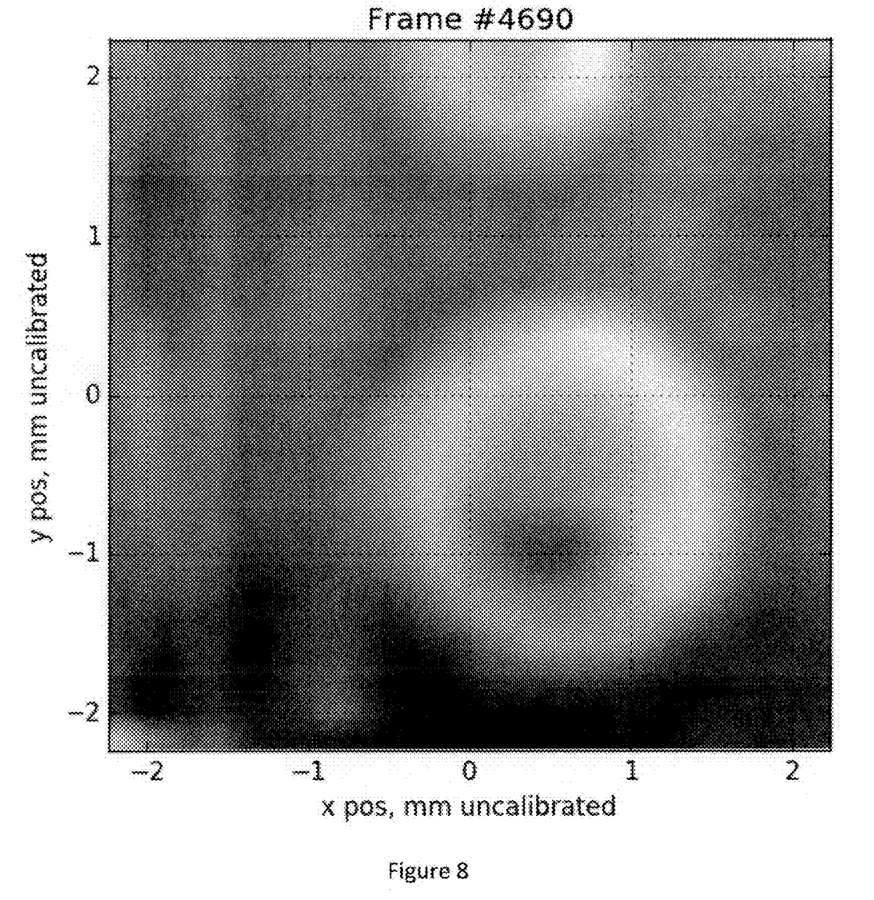
FIG. 8 is a pseudo-image showing intensity data from the collector against scan position.

4 shows one embodiment of such a detector and shows in particular a detector 100 that has a curved plate having a semi-spherical shape and four different axially aligned electrodes, 102, 104, 106 and 108. Each of the four electrodes 102-108 is spaced away from the others by a gap 120, and electrically isolated from each other. Each electrode 102-108 connects to a respective wire 110 (shown collectively for ease of illustration as the four wires 110) That connects to an ammeter/amplifier to measure the current caused by electrons reflecting off the work surface 112 and object and back to the detector 100. As further shown in FIG. 4, the detector 100 has a central aperture 122 through which the interrogation beam 118 (or deposition beam depending on the arrangement) passes. The interrogation beam 118 strikes the work surface 122, which as illustrated can include both the platform and the object being manufactured. In FIG. 4, the beam strikes a wall 144 being formed as part of the object being made on the work surface 112. As is known to those in the art, electrons reflect off the work surface and object and strike against the plates 102-108 of the detector 100. The detector 100 is electrically isolated from the system 50 such that each plate 102-108 is electrically isolated. Typically, each plate 102-108 has a ground that is separate from the ground of the system 50, or at lest the ground of the work surface 112. Electrons reflecting back toward and striking against the detector FIGS. 5 and 6 have a similar geometry, but two and one electrode respectively. Specifically, FIG. 5 shows a detector 150 with two plates, 152 and 154, separated by a gap 170. The beam 168 passes through the aperture 162 and strikes the wall 164 being formed on the work surface 172. Wires 160 carry current from respective plates 152 and 154 to an amplifier and ammeter. FIG. 6 shows a detector 180 with one plate 182. The beam 198 passes through the aperture 192 and strikes the wall 194 being formed on the work surface 202. A wire 19 carries collected current to a current amplifier. All of the depicted embodiments in FIGS. 4-6 have a central aperture or port through which an electron beam can pass. The plates are conductive and will conduct the charge of electrons generated from the work piece. The intensity of the electron stream impacting the conductor plate can be measured and used to determine the topography of the work piece. The plate detector may be biased or unbiased and optionally and typically is located axi-symmetrically with the deposition beam. The plate can detect both back scattered and secondary electrons. By scanning the beam across the surface of the work piece, data can be collected to create a pseudo image of the workpiece. This allows the detector to collect only signal electrons associated with the interrogation beam. In practice, the intensity of the plate detector signal is plotted against the beam scan position and graphed. Intensity changes based on topography or material variations can be seen in the graphed data. Any suitable scan pattern may be used. FIG. 7 depicts a detector 150 of the type shown in FIG. 5 in position within the system 50 depicted in FIGS. 2 and 3. In this embodiment, the detector 162 is disposed over the work surface 84 and has two apertures 162 and 166, one for the deposition beam 72 and one for the interrogation beam (not shown). Each of the two plates of the detector 150 are separated by a gap 170 and connect via respective wires to the amplifier/ammeter that measures the current passing through each respective plate of the detector 150. FIG. 8 depicts one example of a pseudo image created from the intensity generated by the plate detector. This type of plot will be familiar to those of skill in the art of scanning electron microscopy. FIG. 8 plots measured current intensity against the x-position set out in millimeters and plotted along the x-axis of FIG. 8 and against the y-axis, which presents the y-position set out in millimeters of the impinging beam on the work surface. Together the axes plot the x and y coordinates of measured intensity of the current caused by reflected electrons from the work surface. As the interrogation beam scans across the work surface, the collector collects reflected electrons and plots the measured intensity for each spot struck by the interrogation beam. The current measurements are used to determine intensity and create the plot. As noted above of the embodiments of FIGS. 2 and 3, the system of FIG. 7 can use a deposition beam at a first current and the interrogation beam that is at a second higher current. The system may also have a data processor coupled to the depicted amplifier and capable of measuring the amplitude of the current passing through the amplifier. To create the plot, the system has a scan controller for measuring a location of the impingement of the interrogation beam, typically measuring the x and y location of the beam relative to a reference point on the work surface and giving the measurement in millimeters. The collected plot data may be process by an image processor for creating an image of the object as a function of the measured current and the location of the impingement of the interrogation beam.

Figure 9:
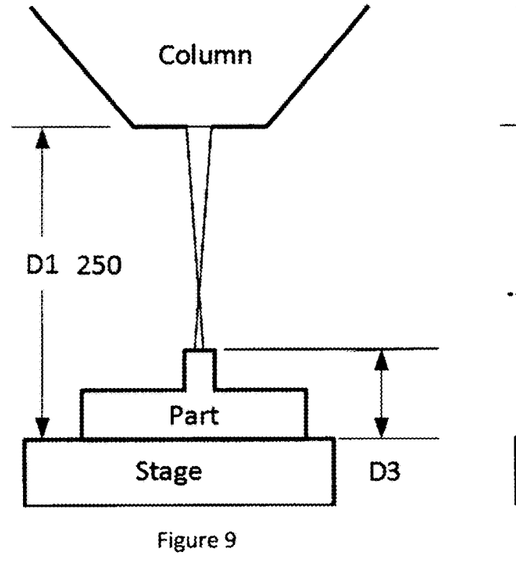
FIGS. 9-11 depict one process for measuring the height of an object being manufactured.
Figure 10:
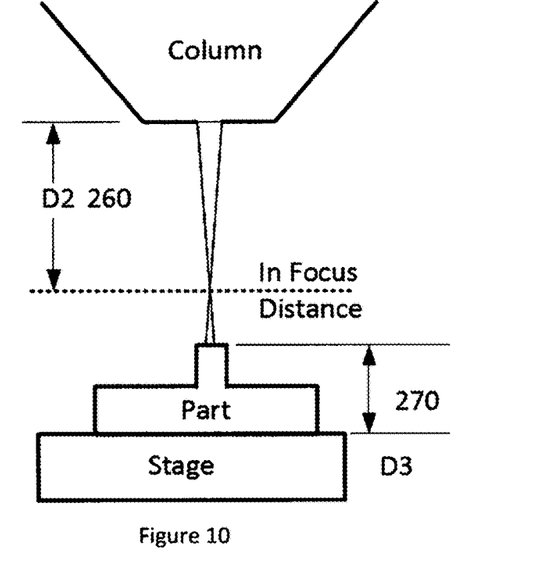
Figure 11:
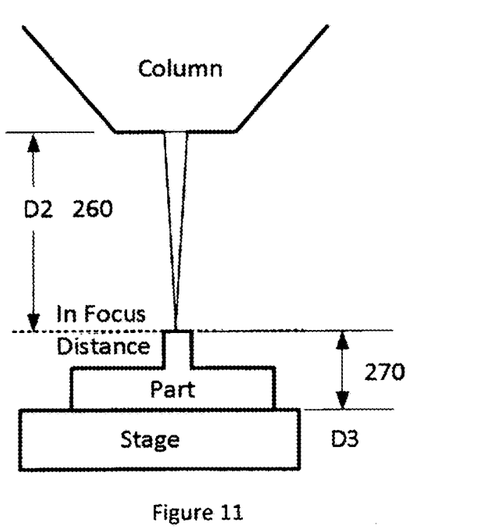

The systems and methods described herein also provide for determining feature size along the z-position. Component build height (or z position, assuming a global coordinate system with the z axis largely perpendicular to the plane of layer deposition) may be extracted by any of several methods. For example, FIGS. 9-11 depict one process wherein a Z height measurement as defined by the electron optical working distance and defined along an axis extending normally from the work surface, as depicted in FIGS. 9-11, can be derived by applying an autofocus algorithm to the interrogation beam, intentionally varying the focusing field and performing signal analysis on the captured beam-component interaction signal. Given that the location of the interrogating optics in the system frame of reference is known, this calculated distance derived from autofocus algorithm can be used to calculate the z position of the beam-component interaction. The relationships between the electron column to substrate distance, the electron optical working distance, which is variable, and the Z height is as follows; D1, depicted as distance 250 in FIG. 9, is the electron column to substrate reference distance. This distance D1 250 may be established by system geometries as the distance from a reference point in the electron optical column to a substrate Z reference position. Distance D2, depicted as distance 260 in FIG. 10, is the electron optical working distance derived from beam operating parameters and used to establish a focal plane in space above the substrate at a distance from the electron optical column as noted above and is variable. D3, depicted as distance 270 in FIG. 10, is the Z position of the feature being measured as determined by applying an autofocus algorithm to the top of the feature by either electrically changing electron optical parameters or mechanically by changing Z axis position. D3 is the Z height measurement derived from D1-D2.

Optionally and alternative, a Z position can be derived by virtual stereoscopic imaging with the interrogating beam. As the source and component under construction move with respect to one another multiple images of the component are captured at a rate that generates overlap of the images. By comparing the overlapping regions of the images captured at different source/component relative positions the apparent motion of features in the overlap regions can be measured. Given that the relative positions of the source and component in system x,y coordinates associated with each image are known, and the optics of the interrogating system are also known, the Z distance from the interrogating optics to the target region can be calculated from these apparent shifts.

Each of the techniques discussed with reference to FIG. 9-11 for determining Z of an object can be computed using an image processing method carried out on a data processor, typically as software system running on a data processor, or as firmware on an embedded system.

Those skilled in the art will know or be able to ascertain using no more than routine experimentation, many equivalents to the embodiments and practices described herein.

Accordingly, it will be understood that the invention is not to be limited to the embodiments disclosed herein, but is to be understood from the following claims, which are to be interpreted as broadly as allowed under the law.

Particular implementations of the subject matter described in this disclosure can be implemented to realize one or more of the following potential advantages.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. Moreover, the separation of various system components in the implementations described above should not be understood as requiring such separation in all implementations, and it should be understood that the described components and systems can generally be integrated together in a single product. Additionally, other implementations are within the scope of the following claims. In some cases, the actions recited in the claims can be performed in a different order and still achieve desirable results.

We claim:

1. A system for manufacturing an object, comprising
a work surface being exposed to the ambient environment and for supporting the object,
a deposition source for generating a deposition beam of electrons at a power sufficient to melt a metal wire to thereby deposit metal on the object,
a wire feed unit for feeding metal wire to the deposition beam,
an interrogation source for generating an imaging beam of electrons having a current set for creating reflected electrons off the object, and
an electron detector including a metal plate with an aperture therein and being located to align the aperture to the path of the deposition beam and for detecting the reflected electrons, and being electrically isolated from the work surface and the deposition source and the interrogation source and being electrically coupled to a remote ground through an amplifier capable of amplifying a current passing through the metal plate and toward the remote ground.

2. The system of claim 1, wherein the metal plate includes a first conductive plate and a second conductive plate, each being electrically isolated from each other and each connected to a remote ground through an amplifier.

3. The system of claim 1, wherein the metal plate includes four plates, each being electrically isolated from each other and each being connected to a remote ground through an amplifier.

4. The system of claim 1, wherein the metal plate includes a second aperture for allowing the interrogation beam to pass through the detector and toward the work surface.

5. The system of claim 4, further comprising a scan controller for measuring a location of the impingement of the interrogation beam.

6. The system of claim 1, further comprising an energy filter disposed in a path between the work surface and the electron detector and generating an electric field of a set strength selected to prevent electrons below a set energy characteristic from reaching the electron detector.

7. The system of claim 6 further comprising an image processor for creating an image of the object as a function of the measured current and the location of the impingement of the interrogation beam.

8. The system of claim 1, wherein the deposition beam is at a first current and the interrogation beam is at a second higher current.

9. The system of claim 1, further comprising a data processor coupled to the amplifier and capable of measuring the amplitude of the current passing through the amplifier.

10. The system of claim 1, further comprising an object height measurement system for focusing an image of the object to measure the height of the object along an axis extending normal from the work surface.

11. A method for manufacturing an object, comprising
supporting an object on a work surface being exposed to the ambient environment,
generating a deposition beam of electrons at a power sufficient to melt a metal wire to thereby deposit metal on the object,
feeding metal wire to the deposition beam,
generating an imaging beam of electrons having a current set for creating reflected electrons off the object, and
detecting reflected electrons impinging on a metal plate having an aperture therein and being located to align the aperture to the path of the deposition beam, and being electrically isolated from the work surface and the deposition source and the interrogation source and being electrically coupled to a remote ground through an amplifier capable of amplifying a current passing through the metal plate and toward the remote ground.

12. The method of claim 11, further comprising providing the metal plate with a first conductive plate and a second conductive plate, each being electrically isolated from each other and each connected to a remote ground through an amplifier.

13. The method of claim 11, further comprising providing the metal plate with four plates, each being electrically isolated from, each other and each being connected to a remote ground through an amplifier.

14. The method of claim 11, further comprising providing the metal plate with a second aperture for allowing the interrogation beam to pass through the detector and toward the work surface.

15. The method of claim 11, further comprising locating an energy filter in a path between the work surface and the electron detector and generating an electric field of a set strength selected to prevent electrons below a set energy characteristic from reaching the electron detector.

16. The method of claim 11, wherein the deposition beam is at a first current and the interrogation beam is at a second higher current.

17. The method of claim 11, further comprising providing a data processor coupled to the amplifier and capable of measuring the amplitude of the current passing through the amplifier.

18. The method of claim 17, further comprising using a scan controller for measuring a location of the impingement of the interrogation beam.

19. The method of claim 18 further comprising using an image processor for creating an image of the object as a function of the measured current and the location of the impingement of the interrogation beam.

20. The method of claim 11, further comprising measuring an object height by focusing an image of the object to measure the height of the object along an axis extending normal from the work surface.

\* \* \* \* \*